June 5, 1945.　　　　F. NELSON　　　　2,377,643
SYSTEM FOR PLUGGING PIPE LEAKS
Filed April 24, 1943
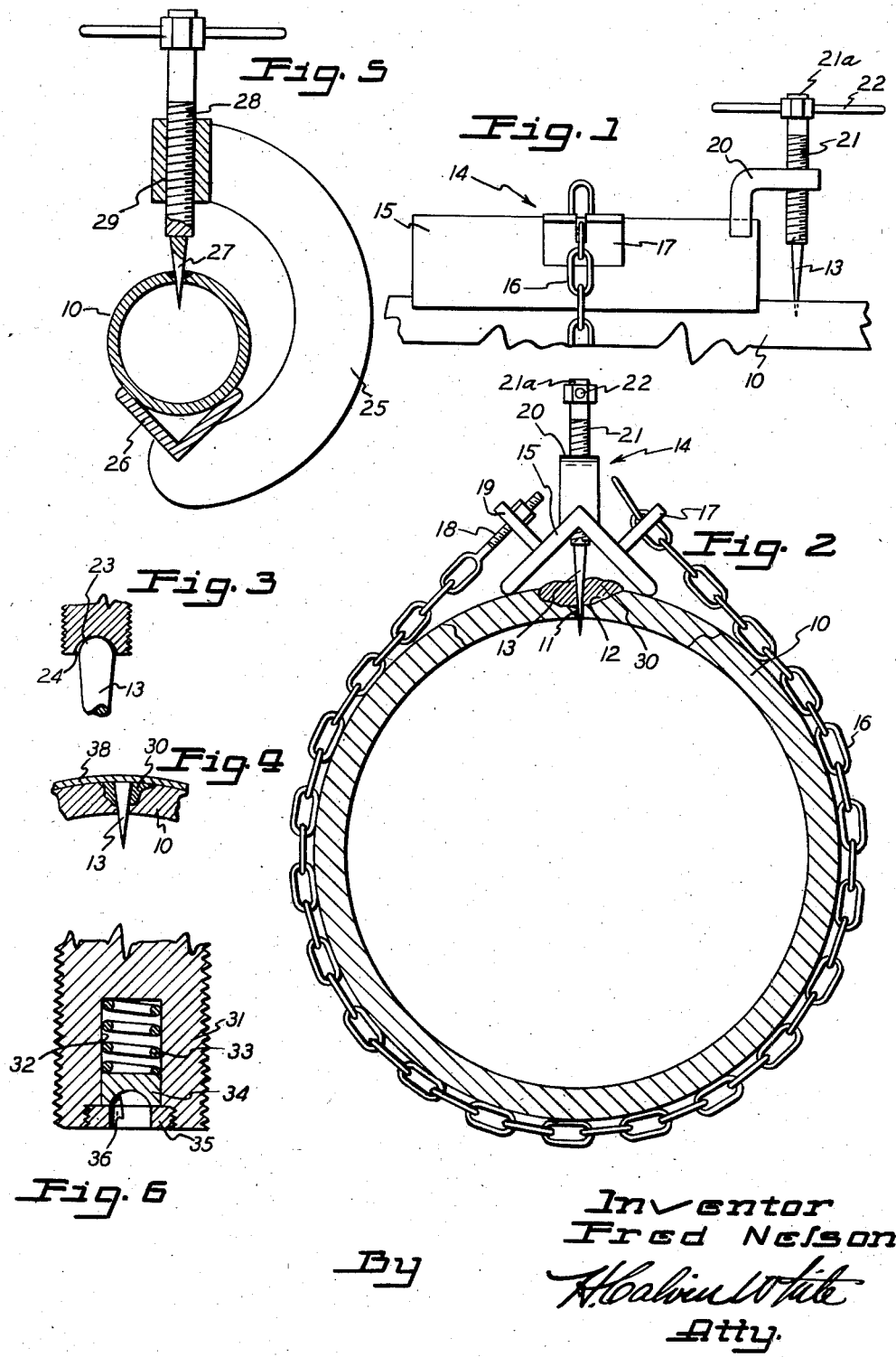

UNITED STATES PATENT OFFICE 2,377,643

SYSTEM FOR PLUGGING PIPE LEAKS

Fred Nelson, Lynwood, Calif.

Application April 24, 1943, Serial No. 484,489

2 Claims. (Cl. 138—97)

This invention has to do with improved methods for plugging small openings in metal pipe, and particularly for the purpose of closing leaks occurring in service pipes carrying fluid under pressure. The invention is applicable generally to the plugging of leaks in all fluid-carrying pipe lines, and has been used with outstanding success for plugging corrosion-created leaks in gas mains and distributing lines.

It is a common occurrence for exterior corrosion of such pipes to result in the formation of small cavities or pitted areas, the depth of which may progress to the point of developing leaks in the pipe. In the past it has been general practice to seal such leaks by the use of threaded plugs turned into the leak openings. Threaded plugs have been used by reason of their ability, because of the threads, to remain with considerable security in the pipe opening, as contrasted with the insecurity of a straight-driven, unthreaded plug which is subject to loosening because of various conditions such as the pressure inside the pipe, and loosening of the plug as a result of expansions and contractions of the metals.

My primary object is to provide a novel method permitting the use of an unthreaded plug, or a type that does not require turning into the leak opening, by a procedure whereby the plug can be brazed or welded to the pipe, the plug thus being permanently held in position and the opening sealed against fluid leakage by the brazing or welding metal. The feature of primary importance is the method whereby the plug is retained in fluid tight engagement with the pipe inside the leak opening, during the brazing or welding operation and while the area of the pipe about the opening is heated to temperatures that would otherwise produce leakage about the plug due to the increased size of the opening resulting from expansion of the pipe metal. In accordance with the invention, after insertion of the plug within the leak opening, a force is constantly applied to the plug tending to advance it into the opening while the pipe is being heated preparatory to and during application of the brazing or welding metal. Preferably I employ a plug having smooth, gradual taper permitting the plug to become tightly wedged in the opening under the applied pressure. As the size of the leak opening increases, the plug is further advanced into the opening to maintain at all times a fully effective fluid seal.

After application of the bonding metal, the pipe cools and shrinks about the plug, thus further increasing the tightness of its engagement within the opening. As previously indicated, the leak commonly occurs in a corrosion-formed cavity. In such instances, the bonding metal is filled into the cavity, and subsequently such metal and the plug are ground off, substantially flush with the outside curvature of the pipe, thus giving a completed seal having the same surface regularity as the pipe itself.

The various features and methods of operation contemplated by the invention, as well as the details of certain typical and illustrative apparatus for applying the plug to the leak opening, will be more fully understood from the description to follow. Reference is had throughout the description to the accompanying drawing in which:

Fig. 1 is a side elevation of a preferred form of clamp device for applying the plug to a fragmentarily shown section of the pipe;

Fig. 2 is an end elevation as viewed from the left of Fig. 1, the clamp chain and pipe being shown in full circle with the top portion of the pipe appearing in section at the leak opening;

Fig. 3 is a fragmentary enlargement of the engaging ends of the clamp bolt and plug pin;

Fig. 4 illustrates the final condition of the seal after surface grinding in conformity with the pipe;

Fig. 5 is a sectional view illustrating a variational form of clamp; and

Fig. 6 is a sectional view showing a variational feature in the clamp bolt.

Referring first to Figs. 1 and 2, the pipe 10 is shown to contain a leak opening 11 at the bottom of a corroded-out surface cavity 12. The leak opening is to be sealed by a plug which preferably has the form of an elongated pin 13 having a smooth surface tapered gradually to a point at the inner end of the pin. The pin is forced into the leak opening and maintained under continuously applied pressure tending to thrust the pin further into the opening, by a suitable screw bolt and clamp assembly, the illustrated chain type being preferred by reason of its adaptability to pipe sizes of widely varying diameters.

The clamp assembly, generally indicated at 14 comprises a support 15 in the form of a length of angle iron held to the pipe by a chain 16, one end of which is attached to lug 17 and the opposite end adjustably attached by bolt 18 to lug 19. The support 15 carries a bracket arm 20 through which is threaded a bolt 21 extending in radial alinement with the pipe 10 and carrying a turning handle 22. As best illustrated in Fig. 3, the outer rounded end 23 of the pin 13 is received within a concave recess 24 of slightly greater curvature, within the end of the bolt 21. Provision thus is made for the proper transmission of force from the bolt to the pin, even though the two may not be in exact axial alinement.

The variational form of clamp shown in Fig. 5 comprises a curved body or yoke 25 carrying an angular member 26 which is applied to the surface of the pipe as illustrated. The plug pin 27 is forced into the leak opening by a bolt 28 threaded at 29 through the upper portion of the clamp body. In this instance, the lower end of the bolt is shown to present a flat surface bearing against the flat outer end of the pin.

In the operation of plugging the leak, the opening 11 and cavity 12 first may be cleaned to remove oxide and scale formations, after which the pin is inserted and the clamp assembly applied to the pipe, the clamp bolt being turned sufficiently to force the pin to a point where any leakage is stopped and sustained pressure is exerted against the pin. Seating of the pin may be aided by tapping the head 21a of the bolt. A torch flame then is applied to the surface of the pipe at the cavity 12 and the pipe metal heated to the proper temperature required for application of brazing or welding metal. When thus heated, the pipe metal expands, enlarging the opening 11. The applied pressure against the pin, or increased pressure that may be applied by further turning of the clamp bolt, advances the pin into the enlarging opening to thus maintain at all times fluid tight engagement between the pin and the pipe metal inside the opening.

After the pipe is heated to proper temperature, brazing or welding metal 30 is fused within the cavity 12 about the pin, thus bonding the latter permanently within the cavity and opening 11. In this connection it may be mentioned that the pin can be made of any suitable metal such as steel. After placement of the bonding metal, the bolt and clamp assembly is removed and the outer portion of the pin and outside surface of the metal 30 ground off substantially flush with the curved surface of the pipe as shown in Fig. 4. The primary purpose of grinding the bonding metal and pin surfaces flush with the pipe contour, is to condition the outside of the pipe for application of a protective coating 38 of asphalt or any of various other coating materials. The presence of any irregularity on the pipe surface tends, at least eventually, to cause exposure through the coating of the metal at the irregularity. Hence the desirability for regularizing the pin and bonding metal surfaces with relation to the outside of the pipe. Further protection may be given the pipe surface by the application of wrapping to the protective layer 38.

Fig. 6 illustrates a variational feature having for its purpose to provide for spring-exerted pressure constantly tending to thrust the pin into the leak opening. The inner end of a clamp bolt 31 may be provided with a bore 32 containing a stiff coil spring 33 bearing against a movable bearing member 34. The latter is suitably retained within the bolt as by the retaining ring 35. Member 34 has a cavitated surface 36 engageable with the rounded end of the pin 13, as and for the purposes previously described. The bolt 31 may be turned against the pin sufficiently to cause displacement of bearing member 34 to a point fully compressing the spring 33, thus enabling the bolt to exert unyielding thrust against the pin to initially seat it within the leak opening. Thereafter, the spring 33 exerts a continuous thrust against the pin, thus assuring its tight seating in the leak opening as the latter enlarges, without necessitating any further adjustment of the bolt.

I claim:

1. The method of sealing a small leak opening in a metal pipe containing fluid under pressure, that includes inserting an externally tapered metal pin into said opening, heating the pipe at said opening and fusing metal around the pin to bond it to the pipe, and continuously exerting against the pin a force tending to thrust its tapered portion into said opening and thereby maintain the pin in fluid tight engagement with the portion of the pipe forming the inside edge of said opening by causing the plug to advance within and in accordance with enlargement of the opening as a result of said heating.

2. The method of sealing a small leak opening in a corrosion formed cavity in a metal pipe, that includes inserting an externally tapered metal pin into said cavity and opening, heating the pipe at said opening and fusing metal within said cavity about the plug to bond it to the pipe, and continuously exerting against the pin a force tending to thrust its tapered portion into said opening and thereby maintain the pin in fluid tight engagement with the portion of the pipe forming the inside edge of said opening by causing the plug to advance within and in accordance with enlargement of the opening as a result of said heating.

FRED NELSON.